United States Patent [19]

Piotrowski

[11] 4,422,653

[45] Dec. 27, 1983

[54] CHUCK FOR TUBULAR WORKPIECES

[75] Inventor: Charles Piotrowski, Suttons Bay, Mich.

[73] Assignee: Sheffer Collet Company, Traverse City, Mich.

[21] Appl. No.: 369,246

[22] Filed: Apr. 16, 1982

[51] Int. Cl.³ ............................................. B23B 31/20
[52] U.S. Cl. .................... 279/2 A; 279/1 Q; 279/2 R; 279/4; 279/41 R; 279/46 R
[58] Field of Search ............ 279/1 SJ, 2 R, 4, 1 Q, 279/1 L, 15, 41 R, 123, 46, 46 A, 41 A, 50, 51; 269/26, 48.1, 287; 242/72, 72 B, 72 R, 72.1; 294/93, 94, 96; 409/277; 285/322, 341; 403/227, 228, 371

[56] References Cited

U.S. PATENT DOCUMENTS

| | | | |
|---|---|---|---|
| 2,749,160 | 6/1956 | Cowles | 403/227 |
| 2,829,899 | 3/1958 | Drew et al. | 279/41 R |
| 2,896,954 | 7/1959 | Ernest | 279/2 |
| 3,360,276 | 12/1967 | Peffer | 279/41 |
| 3,448,988 | 6/1969 | Athanasiou | 279/1 Q |
| 3,497,226 | 2/1970 | Hohwart | 279/50 |
| 3,637,156 | 1/1972 | Shepherd | 242/72.1 |
| 3,638,979 | 2/1972 | Francois et al. | 279/2 X |
| 3,761,008 | 9/1973 | Goulder | 269/48.1 X |
| 3,829,147 | 8/1974 | Ryswick | 242/72 X |
| 4,284,283 | 8/1981 | Stermann | 279/2 R |

FOREIGN PATENT DOCUMENTS

2025278  1/1980  United Kingdom ............. 279/41 R

Primary Examiner—William R. Briggs
Assistant Examiner—Glenn L. Webb
Attorney, Agent, or Firm—Price, Heneveld, Huizenga & Cooper

[57] ABSTRACT

A chuck is provided with a cylindrical workpiece gripping element having a jacket and an article gripping member and a resilient rubber-like sleeve sandwiched between. The jacket and gripping member are partially segmented into longitudinal strips so that the element as a whole can be diametrically expanded and contracted and when used to grip a workpiece having an eccentric surface the element will automatically adjust to apply equal pressure at all points on the workpiece surface and thus not distort the workpiece. The element is expanded and contracted by movable jaws.

15 Claims, 13 Drawing Figures

CHUCK FOR TUBULAR WORKPIECES

FIELD OF THE INVENTION

This invention relates to chucks and more particularly to chucks designed for initial machining of relatively thin cylindrical castings such as those used as cylinder liners for engines. Castings of this type are normally sand cast rather than die cast as a matter of economics. As such, the castings frequently have minor but significant irregularities. This invention provides a chuck for machining such castings more economically and rapidly with a substantial reduction in scrap product.

Due to the inability to repeatedly sand cast the cylindrical blanks to precisely accurate dimensions, many of the castings are received by the machine shop with varying degrees of external out-of-roundness or eccentricity. Heretofore, such castings have been mounted in a chuck the jaws of which closed in on the casting's external surface with equal incremental of movement of each jaw. If the casting was out-of-round or eccentric, the force of the jaws corrected this situation by eliminating the eccentricity. While so held the casting was internally machined. However, when the jaws were released the casting returned to its original eccentric shape. Then the casting was gripped on the inner face and externally machined to produce an external surface which would remain concentric when released by the chuck. Using this surface as an index, the inside was again machined to make it concentric with the external surface. Overall, this procedure is time consuming, labor intensive and wasteful of metal. To be certain there was sufficient metal to complete a sleeve of the necessary wall thickness the original casting had to have a much greater thickness of metal, an excess which had to be removed by machining during the finishing process.

BRIEF DESCRIPTION OF THE INVENTION

The invention overcomes these problems by providing a chuck capable of automatically adjusting itself to accommodate areas of eccentricity in the external surface while maintaining uniform unit gripping pressure throughout the entire external surface of the workpiece. By doing this the casting workpiece is not distorted by the chuck. As a result, the internal surface initially machined into the workpiece remains circular when the workpiece is released and can be used as an accurate index surface for the machining of the external surface. Repeated, subsequent turnings to produce concentric surfaces are rendered unnecessary. The invention accomplishes this by providing a cylindrical workpiece gripping surface consisting of interconnected, narrow, parallel, axially extending flexible metal gripping fingers surrounded by a cylinder of resilient, rubber-like material which both transmits and distributes the clamping pressure applied to it by plurality of radially movable clamping jaws.

DESCRIPTION OF THE PREFERRED EMBODIMENT

Figure 2:
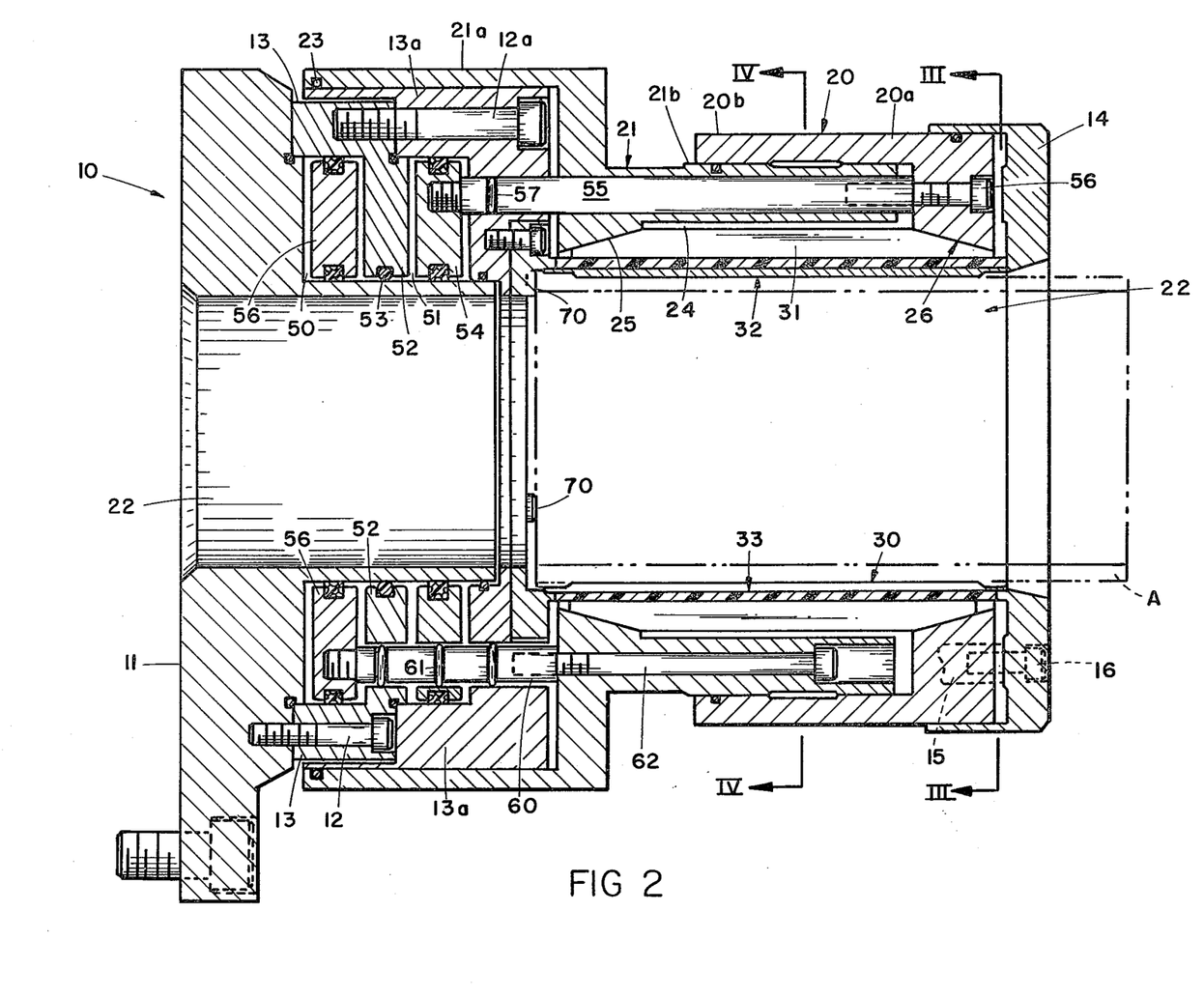
FIG. 2 is a sectional view taken along the plane II—II of FIG. 1.
Figure 3:
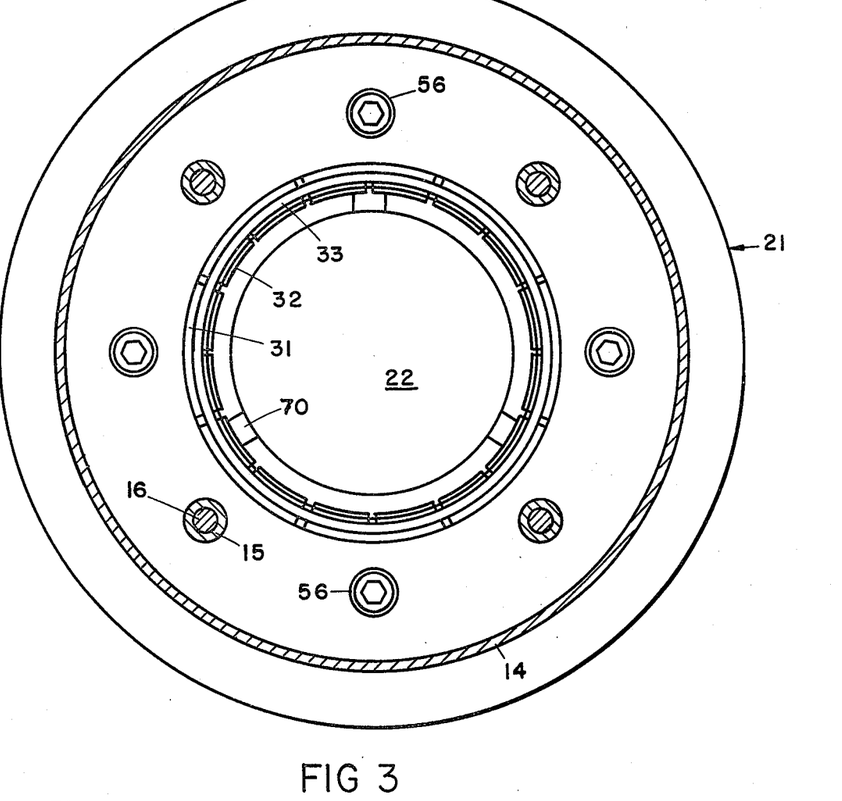
FIG. 3 is a sectional view taken along the plane III—III of FIG. 2.

Referring to FIG. 2, the numeral 10 designates a chuck having a base 11 to which is bolted by cap screws 12 and 12a, body members 13 and 13a. At its front end, the chuck has an annular cap 14 secured to the body member 13a by fixed posts 15 and cap screws 16 (FIG. 2). The base 11 has bolt holes 17 for attachment to the machine with which it is to be used.

The chuck has a pair of telescopically interfitted clamping jaws including a forward jaw 20 and a rear jaw 21. These jaws are annular and have a central workpiece receiving opening 22 extending through them. The opening 22 extends entirely through the chuck but this is not essential. The rear jaw 21 has a radially enlarged portion 21a which slidably and closely seats over the body member 13a. The body member 13a provides positive radial and axial support for the jaw 21 by reason of the close fit. Entrance of dirt between the parts is prevented by the seal 23.

The forward end 21b of the rear jaw 21 is of reduced external diameter and in effect is a supporting and guiding sleeve for the forward jaw 20. The inner surface of the forward end 21b is provided with a relief 24, and adjacent its rearward end has an internally facing, annular camming surface 25 which is inclined inwardly and rearwardly.

The forward jaw 20 has a forward header portion 20a and a rearwardly extending annular sleeve 20b which slidably seats closely over the forward end 21b of the rear jaw. The header portion 20a has an internally facing, annular, camming surface 26 which is inclined inwardly and forwardly. The angular relationship of the surfaces 25 and 26 to the axis of the chuck are identical.

Seated concentrically within the jaws 20 and 21 and extending between the camming surfaces 25 and 26 is a generally cylindrical tubular, compressible collar or workpiece clamp assembly 30. The clamp assembly 30 has an outer jacket 31, an inner collet 32 and sandwiched between them a resilient sleeve 33.

Figure 7:
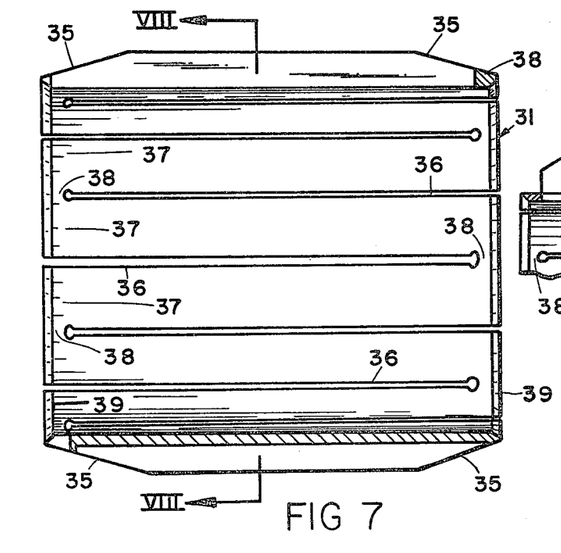
FIG. 7 is a sectional view of the outer shell of the compressible collar.
Figure 8:
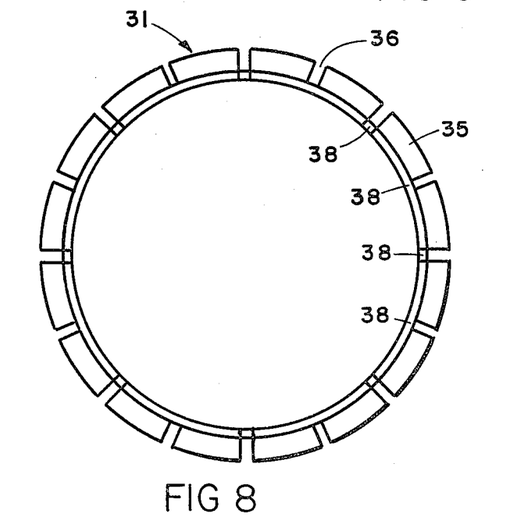
FIG. 8 is a sectional view taken along the plane VIII—VIII of FIG. 7.
Figure 9:
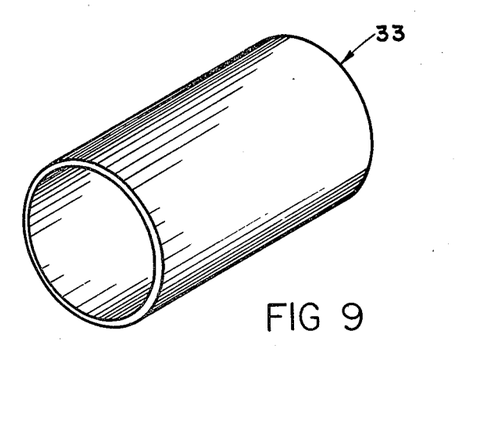
FIG. 9 is an oblique view of the resilient sleeve which is seated between the gripping collet and the shell.

The outer jacket 31 is an elongated tube of a suitable, resilient material such as steel. As best seen in FIGS. 7 and 8, each end of the outer jacket 31 is externally bevelled to form wedging surfaces 35 of a size and inclination to seat flush against the camming surfaces 25 and 26. The length of the outer jacket is such that when the jaws 20 and 21 are at maximum separation the camming and wedging surfaces are seated against each other.

To provide the outer jacket 31 with radial flexibility and thus the ability to be radially compressed, a plurality of slits 36 are formed in it at closely and evenly spaced intervals. Each slit 36 extends from one end to a point closely adjacent the opposite end of the jacket. The slits 36 are alternately arranged to extend from opposite ends, creating a plurality of narrow, axially extending fingers 37 with each finger integral through a narrow bridge 38 with a different adjacent finger at its opposite ends. It will be observed in FIG. 7 that the bridges 38 are both narrow and relatively thin, thus, providing only limited resistance to flexure while maintaining structural integrity. The opposite ends of the jacket are chamfered at 39.

Seated within the jacket 31 is the sleeve 33. Preferably the sleeve is an elongated tube of a resilient, cutting oil resistant elastomer of approximately $\frac{1}{8}$ inch wall thickness. A suitable material is a polyurethane elastomer such as Flexane 30 manufactured by Devcon Corporation. The material as used had a hardness of Shore A30.

Figure 5:
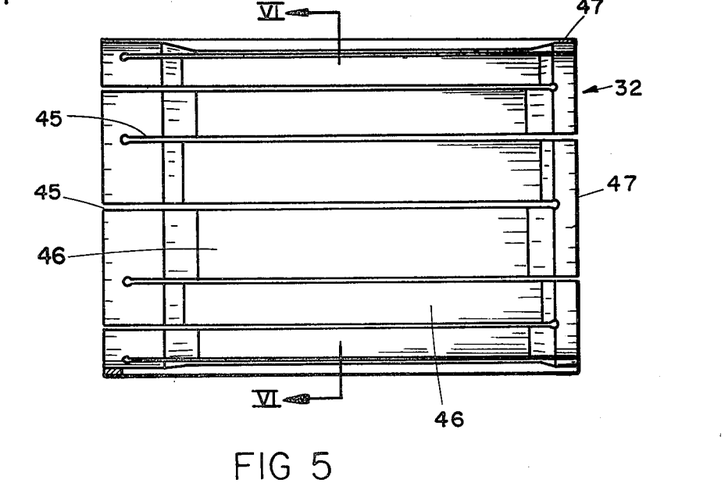
FIG. 5 is a sectional elevation view of the workpiece gripping collet of the compressible collar.
Figure 6:
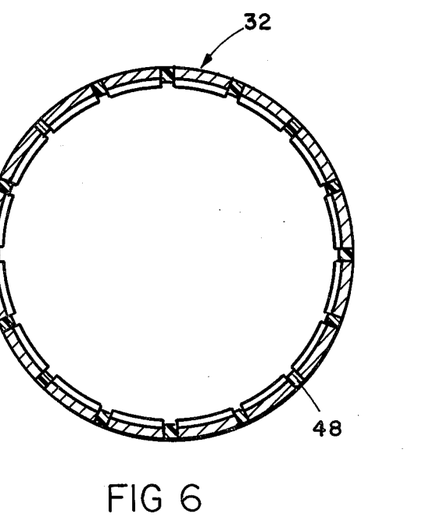
FIG. 6 is a sectional view taken along the plane VI—VI of FIG. 5.

Seated within the sleeve 33 is the workpiece gripping collet 32 (FIGS. 2, 5 and 6). The collet 32 is very similar in construction to the outer jacket 31. It is a cylindrical tube of somewhat greater length than the jacket 31 (FIG. 2) and like the jacket is made radially flexible and compressible by a plurality of closely and evenly spaced slits 45 which open through one end and terminate just short of the other end. Slits extending through opposite ends are arranged alternately. Thus, each finger 46 created by the slits is connected at its opposite end to a different one of its adjacent fingers by a thin narrow bridge 47 (FIG. 5). Preferably, the slits 45 are filled with a web of elastomeric material 48 (as shown in FIG. 6) such as RTV732, a silicone rubber sold by Dow Corning Corporation. This procedure excludes dirt chips or other foreign material becoming wedged in the slits and interfering with the circumferential closing of the slits when the collet is radially compressed (FIG. 6). For the greater portion of their lengths each of the fingers has an inwardly projecting portion of greater thickness (FIGS. 5 and 6). While it is not essential, it is preferable that the sleeve 33 be bonded to both the inner collet and the outer jacket. A snug fit could be substituted but is not considered to be desirable.

Figure 12:
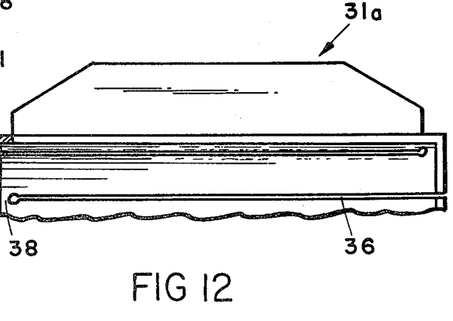
FIG. 12 is a fragmentary view of a modified construction for the workpiece gripping collet.

FIG. 12 illustrates the fact that the chuck could be adapted to clamp workpieces of smaller sizes by increasing the radial thickness of the outer jacket 31a to compensate for the smaller diameter of the central opening for the workpiece.

Figure 4:
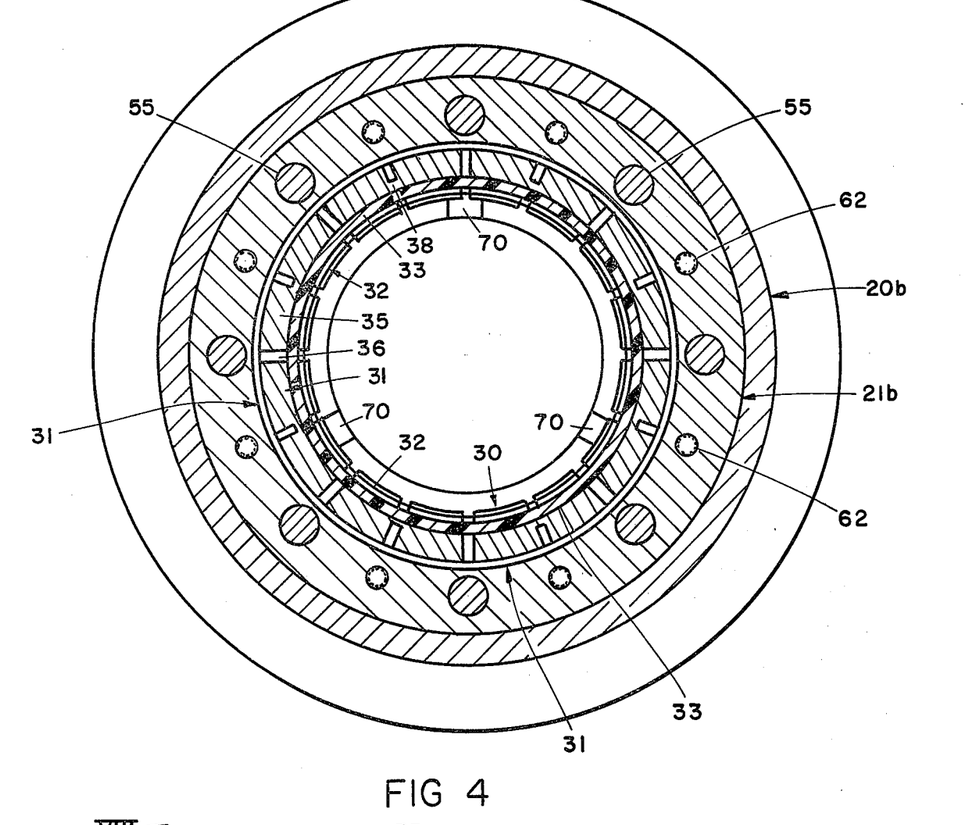
FIG. 4 is a sectional view taken along the plane IV—IV of FIG. 2.
Figure 10:
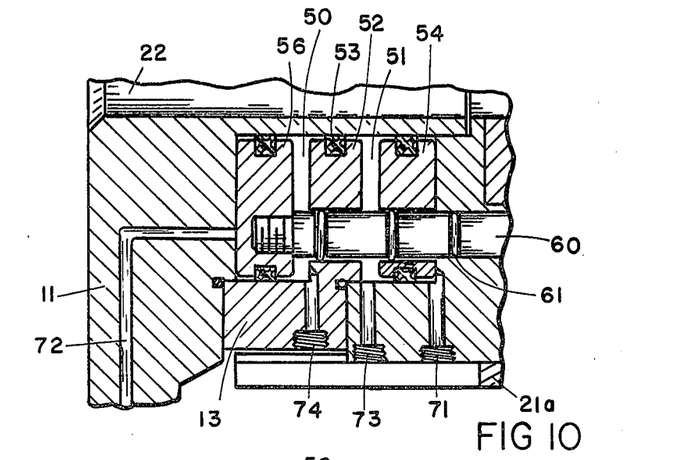
FIG. 10 is a fragmentary, sectional view taken along the plane X—X of FIG. 1 showing the chuck actuator in workpiece release position.
Figure 11:
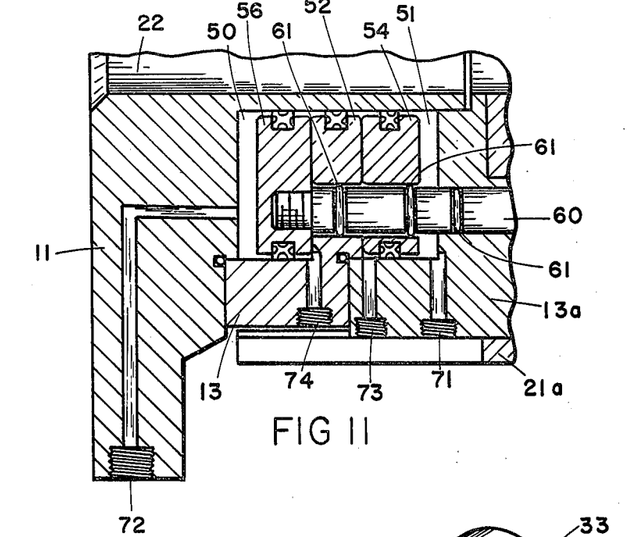
FIG. 11 is a view similar to FIG. 10 showing the actuator in clamp position.

The chuck is hydraulically operated. For this purpose the chuck body has a pair of annular chambers 50 and 51 between the base 11 and the stationary body members 13 and 13a (FIGS. 10 and 11). The chambers are separated by a radially inwardly extending wall 52 integral with the rear stationary body member 13. The inner face of the wall 52 seals against a forwardly extending shell of the stationary body 11 by means of the seal 53. Seated in the chamber 51 is an axially movable, annular piston 54. The piston 54 is connected to the forward jaw 20 by rods 55 which extend slidably through the rearward jaw 21 (FIGS. 2 and 4). The forward ends of the rods are secured to the forward jaw by cap screws 56 (FIG. 2). The number of rods depends upon the diameter of the chuck but must be sufficient to assure non-binding and uniform movement of the forward jaw. For example, for a chuck having a five inch diameter workpiece opening, eight rods are adequate. Each rod is surrounded by at least one O-ring seal 57 to prevent leakage of hydraulic fluid.

Figure 1:
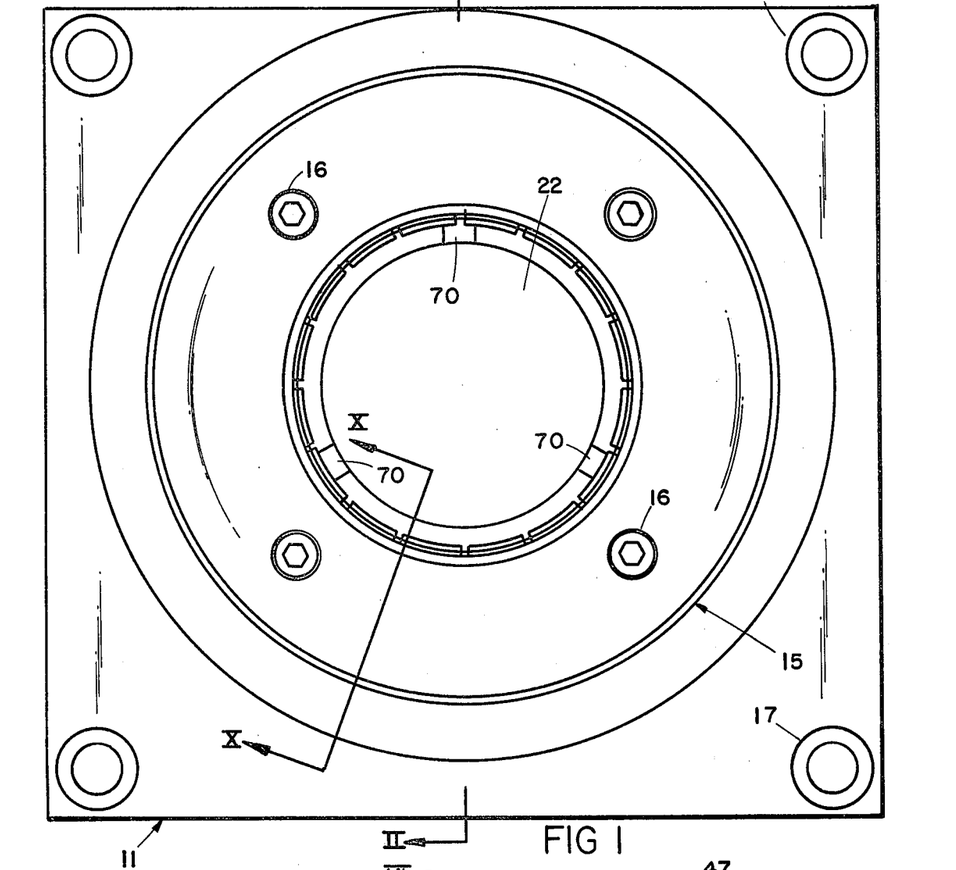
FIG. 1 is a front end view of a chuck incorporating this invention.

The piston 56 is connected to the rear jaw 21 by rods 60. The rods 60 extend through the wall 52 and the piston 54 and are provided with O-ring seals 61 to prevent leakage along the rods. The rods are secured to the rear clamp by bolts 62 (FIGS. 1 and 2).

To operate the chuck, a casting A is seated in the central opening 22. It is pushed in until it seats against the work stops 70 (FIGS. 1 and 2). Then fluid under pressure is admitted through lines 71 and 72 (FIG. 11) to shift piston 54 rearwardly and piston 56 forwardly while fluid is exhausted from behind the opposite sides of these pistons through conduits 73 and 74. This results in the camming surfaces 25 and 26 being moved toward each other thereby radially compressing the workpiece clamping collar or assembly 30 and squeezing it about the casting A. If the casting is eccentric or has surface irregularities, because of the radial flexibility of the clamping assembly and its ability to prevent clamping pressures from becoming concentrated in areas where the outer surface of the casting has the greatest radius, the casting will not be distorted. The resilient sleeve 33 is of a material which has limited ability to migrate thus permitting the jaws 20 and 21 to close while the clamping assembly or collar 30 adjusts to accommodate the casting's irregularities. As it does so, the migration of the material of the sleeve 33 redistributes the unit pressure exerted on the casting so that it is uniformly distributed throughout the entire external surface of the casting. The slits in the collet 32 provide the collet with the ability to flex as necessary to seat firmly about the casting. Also because the casting will be gripped at all points with substantially equal pressure, it will be positively held. Thus, the adjustability of the collar does not reduce the chuck's ability to effectively grip the castings.

When the internal machining of casting A has been completed it is released by bleeding the fluid in conduits 71 and 72 and introducing fluid under pressure through conduits 73 and 74. This reverses the pistons 54 and 56 shifting them to the position illustrated in FIG. 10. This separates the jaws 20 and 21. The resiliency of the collar assembly 30 will cause it to expand to its original size, releasing the machined workpiece.

Using previously available chucks it was not uncommon to have some radial distortion resulting in the interior machined surface being in the range of 0.015–0.020 inch out-of-round. This is ten times or more the allowable departure from circularity permitted in cylinder sleeves which are normally limited to a deviation of 0.0015 inch maximum. This invention, for the first time reduces the distortion to or below the 0.0015 inch which is the maximum acceptable for engine sleeves.

Figure 13:
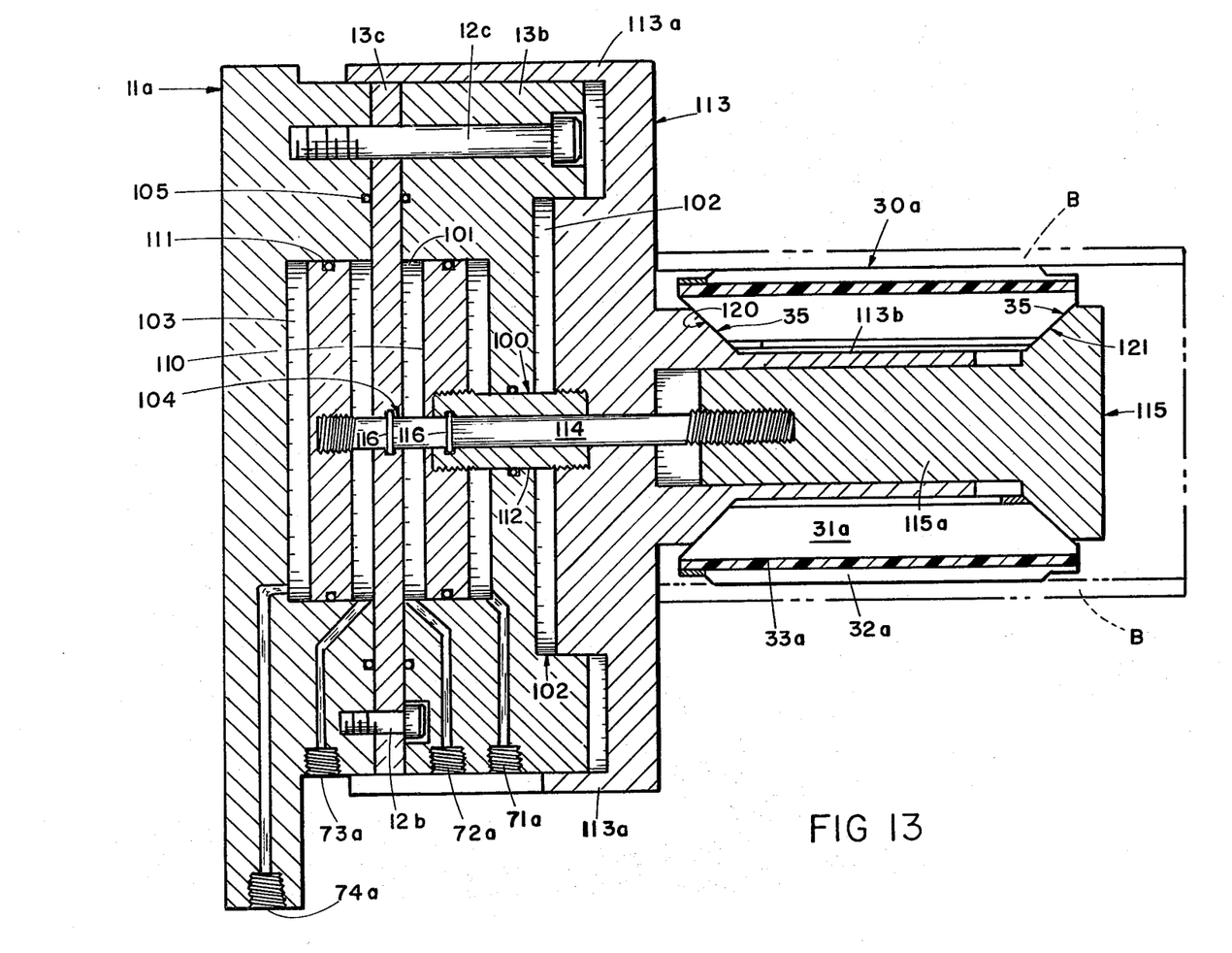
FIG. 13 is a sectional view similar to FIG. 2 illustrating this invention applied to an internal gripping chuck.

FIG. 13 illustrates the application of this invention to an I.D. or internal gripping chuck. The principles and interrelationship of the various parts remain the same. The base 11a supports a pair of body members 13b and 13c. The body member 13c is secured to the base by cap screws 12b, the heads of which may be recessed into the rear face of the body member 13b. The body member 13b is secured to the base by bolts 12c which extend through clearanace holes in the body member 13c.

The body member 13b has a central opening 100 communicating with a cavity 101 opening through its rear face and a recess 102 opening through its forward face. On the opposite side of the body member 13c a cavity 103 of the same diameter and length as the cavity 101 is recessed into the base. The two cavities are separated from each other by the body member 13c, except for a central opening 104. Annular seals 105 are recessed into the base 11a and body member 13b concentrically of the cavities 101 and 103 and provide fluid seals on opposite sides of the body member 13c.

A piston 110 is seated in the cavity 101 and piston 111 is seated in the cavity 103. The piston 110 is connected to sleeve 112 which extends slidably through opening 100. Its rear end is threadedly connected to the piston 110 and its forward end is threadedly connected to the rear jaw 113, connecting the piston and jaw for simultaneous movement. The sleeve 112 and piston 110 have aligned central openings to slidaly seat the rod 114. The rear end of the rod 114 is threadedly secured to the piston 111. Its forward end is secured to the forward jaw 115. Where the rod 114 passes through the body member 13c and the piston 110, it is encircled by seals 116.

The rearward jaw has a radially enlarged rearward skirt portion 113a which slidably seats over the body members 13b and 13c and the base 11a. The forward end 113b of the jaw is tubular providing an elongated circular wall into which the rearward end 115a of the forward jaw 115 is slidably seated. Between the rearward and forward portions of the rear jaw, the jaw 113 has a transition portion which is provided with a forwarding and inwardly inclined conical camming surface 120. In like manner the forward jaw has an inwardly and rearwardly inclined, conical camming surface 121. These surfaces are comparable to the camming surfaces 25 and 26 illustrated in FIG. 1.

Seated between the camming surfaces 120 and 121 and surrounding the jaws is a workpiece clamp assembly 30a which is comparable to the clamp assembly 30 except the radial arrangement of its components is reversed. In the clamp assembly 30a, jacket 31a is similar in construction 31 except its bevelled wedging surfaces 35a extend inwardly to seat between and against the camming surfaces 120 and 121. The jacket 31a is surrounded by a sleeve 33a of resilient material identical to the sleeve 33. The sleeve is surrounded by a shell-like external collet 32a which serves as the gripping means for the workpiece or casting B. By means of the conduits 71a, 72a, 73a and 74a fluid is introduced to shift the pistons to contract or separate the jaws 113 and 115. When the jaws are contracted the clamp assembly 30a is forced to expand and grip the workpiece B. As in the case of the chuck illustrated in FIG. 1, the flexibility of the jacket 31a, sleeve 33a and the collet 32a permits the clamp assembly to accommodate eccentricity in the rough casting without distortion of the casting while maintaining an effect grip on the workpiece.

Having described both a preferred embodiment and a modification of the invention and its operation, it will be understood that other modifications can be made without departing from the principles thereof. Such modifications are to be considered as included in the hereinafter appended claims unless these claims by their language expressly state otherwise.

The embodiments of the invention in which an exclusive property or privilege is claimed are defined as follows:

1. A chuck for gripping the outer surface of tubular workpieces which outer surface may be eccentric, said chuck including a forward jaw and a rear jaw, said jaws being cylindrical and telescopically partially interfitted; said forward jaw adjacent its forward end having an inwardly facing rearwardly and outwardly inclined camming surface; said rearward jaw adjacent its rearward end having an inwardly facing forwardly and outwardly inclined camming surface; a cylindrical clamping jacket, said jacket having a plurality of circumferentially arranged segments each capable of independent radial maneuvers, each of said segments having a radially outwardly extending wedge at each end engaging said camming surfaces; a cylindrical sleeve of resilient rubber-like material seated within said clamping jacket and a metallic cylindrical liner seated within said sleeve; said liner being thin and having a plurality of circumferentially arranged segments each capable of independent radial movement; means for moving said jaws telescopically toward and away from each other.

2. A chuck for gripping the inner surface of tubular workpieces which inner surface may be eccentric, said chuck including a forward jaw and a rear jaw, said jaws being cylindrical and telescopically partially interfitted; said forward jaw adjacent its forward end having an outwardly facing forwardly and outwardly inclined cam surface; said rearward jaw adjacent its rearward end having an outwardly facing rearwardly and outwardly inclined cam surface; a cylindrical clamping jacket, said jacket having a plurality of circumferentially arranged segments each capable of independent radial movement, each of said segments having a radially inwardly extending wedge at each end engaging said cam surfaces; a cylindrical sleeve of resilient rubber-like material seated around said clamping jacket and a metallic cylindrical sheathe seated around said sleeve; said sheathe being thin and having a plurality of circumferentially arranged segments each capable of independent radial movement; means for moving said jaws telescopically toward and away from each other for expanding and contracting said jacket, sleeve and sheathe to engage and release workpieces.

3. A chuck as described in either claim 1 or 2 wherein said means for moving said jaws is a pair of pistons; a jaw supporting body having an internal cavity, said body having a flange dividing said cavity into a pair of chambers arranged in tandem along the lengthwise axis of said chuck; one of said pistons being in each chamber; means for introducing and discharging fluid from said cavities to cause said pistons to move in opposite directions simultaneously.

4. A chuck for gripping tubular workpieces the chuck contacting surface of which may be eccentric, said chuck including a tubular workpiece clamping element, said element having a cylindrical clamping jacket, said jacket having a plurality of circumferentially arranged segments each capable of independent radial movement; a cylindrical sleeve of resilient rubber-like material seated against the face of said jacket; a tubular workpiece grip seated against the face of said sleeve opposite from said jacket; said grip having a plurality of circumferentially arranged segments each flexible and capable of independent radial movement; movable means for compressing said clamping element to vary its internal and external diameters by causing the segments of said jacket and grip to shift circumferentially toward and away from each other for gripping and releasing workpieces, the material of said sleeve being capable of both axial and circumferential migration in response to differential resistance to diametric change imposed by a workpiece.

5. A chuck for gripping tubular workpieces, the chuck contact surface of which may be eccentric as described in claim 4 wherein said movable means is a pair of jaws, said clamping element being seated between and supported by said jaws; said jaws being movable with respect to each other for varying the diameter of said clamping element.

6. A chuck for gripping tubular workpieces, the chuck contact surface of which may be eccentric as described in claim 5 wherein said jaws have a central workpiece receiving opening; said clamping element being within and surrounding said opening and said grip forming the inside surface of said clamping element.

7. A chuck for gripping tubular workpieces, the chuck contact surface of which may be eccentric as described in claim 5 wherein said jaws are arranged as an axially extending central column and said clamping element is seated over and surrounds said column and said grip forming the external surface of said clamping element.

8. A diametrically variable tubular workpiece clamp comprising a steel jacket, a steel grip member and a resilient sleeve seated between them; said jacket being tubular and having a plurality of slots extending lengthwise thereof whereby said jacket is circumferentially compressible, each slot opening through one end of said jacket and terminating in a blind end closely adjacent the other end of said jacket; said slots being circumferentially equally spaced with alternate ones opening through opposite ends of said jacket; said grip member having the same construction as said jacket, being circumferentially compressible and concentric with said jacket; said sleeve being of a resilient rubber-like material having memory and capable of radial and circumferential migration in response to radially acting compressive forces; said jacket being seated tightly against one face of said sleeve and said grip member being seated tightly against the other face of said sleeve.

9. A diametrically variable tubular workpiece clamp as described in claim 8 wherein said jacket is external of said sleeve and said grip member is internal of said sleeve.

10. A diametrically variable tubular workpiece clamp as described in claim 8 wherein said jacket is internal of said sleeve and said grip member is external of said sleeve.

11. A diametrically variable tubular workpiece clamp as described in claim 8 wherein said sleeve has a radial thickness of approximately ¼ inch.

12. A diametrically variable tubular workpiece clamp as described in claim 8 wherein said sleeve has a radial thickness of approximately ¼ inch and a hardness of Shore A30.

13. A chuck for gripping tubular workpieces the surface of which may be eccentric, a tubular workpiece clamp having an outer cylindrical sheathe, an inner cylindrical sheathe and a tubular sleeve seated between and firmly engaging both of said sheathes; said sleeve being of a resilient material having memory and capable of radial and circumferential migration; said sheathes each being segmented into elongated strips interconnected at an end of the sheathe whereby said sheathes are capable of diametric expansion and contraction; movable jaw means for alternately compressing and releasing said clamp.

14. A chuck for gripping tubular workpieces as described in claim 13 wherein interengaging cam surfaces are provided on said jaws and said clamp for transferring movement of said jaws to said clamp.

15. A chuck for gripping tubular workpieces as described in claim 14 wherein said cam surfaces are at opposite ends of said clamp.

* * * * *